(12) United States Patent
Huang et al.

(10) Patent No.: US 12,201,893 B2
(45) Date of Patent: Jan. 21, 2025

(54) TARGET USER LOCKING METHOD AND ELECTRONIC DEVICE

(71) Applicant: HUAWEI TECHNOLOGIES CO., LTD., Shenzhen (CN)

(72) Inventors: Lei Huang, Shenzhen (CN); Xiaohan Chen, Shenzhen (CN); Jie Zhao, Shenzhen (CN); Jiejing Huang, Shenzhen (CN); Yue Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 17/636,725

(22) PCT Filed: Aug. 4, 2020

(86) PCT No.: PCT/CN2020/106913
§ 371 (c)(1),
(2) Date: Feb. 18, 2022

(87) PCT Pub. No.: WO2021/036717
PCT Pub. Date: Mar. 4, 2021

(65) Prior Publication Data
US 2022/0284738 A1    Sep. 8, 2022

(30) Foreign Application Priority Data
Aug. 30, 2019   (CN) .......................... 201910815716.X

(51) Int. Cl.
*A63F 13/211*    (2014.01)
*G06T 7/20*    (2017.01)
*G06V 10/62*    (2022.01)
*G06V 40/16*    (2022.01)
*G06V 40/20*    (2022.01)
*G06V 40/50*    (2022.01)

(52) U.S. Cl.
CPC .............. *A63F 13/211* (2014.09); *G06T 7/20* (2013.01); *G06V 10/62* (2022.01); *G06V 40/172* (2022.01); *G06V 40/23* (2022.01); *G06V 40/50* (2022.01); *G06T 2207/30201* (2013.01); *G06V 2201/07* (2022.01)

(58) Field of Classification Search
CPC .... A63F 13/211; A63F 13/814; A63F 13/816; A63F 13/212; A63F 13/213;
(Continued)

(56) References Cited

U.S. PATENT DOCUMENTS

2011/0306397 A1* 12/2011 Fleming ................... G06F 3/011
463/31
2012/0295705 A1   11/2012 Hanawa
(Continued)

FOREIGN PATENT DOCUMENTS

CN    101662986 A  *  3/2010    ........... A61B 5/1114
CN    105654512 A  *  6/2016    ........... G06K 9/6256
(Continued)

OTHER PUBLICATIONS

Real-time Pedestrian Tracking in Indoor Environments—2014 (Year: 2014).*

*Primary Examiner* — Nizar N Sivji
(74) *Attorney, Agent, or Firm* — Rimon PC

(57) ABSTRACT

Embodiments of this application provide a target user locking method and an electronic device, and relate to the field of electronic devices. The method provided in this application may be applied to an artificial intelligence (artificial intelligence, AI) fitness scenario, and can ensure accuracy of locking a target user. The electronic device may recognize the target user and track the target user in a fitness process by using a method such as recognizing a user feature, recognizing the user with reference to data collected by a wearable device worn by the user, or recognizing a motion mode of the user.

6 Claims, 7 Drawing Sheets

An electronic device determines a target user — S201

The electronic device tracks the target user, and collects a human body image of the target user in a tracking process — S202

The electronic device performs fitness guidance based on the human body image collected in S202 — S203

(58) Field of Classification Search
CPC ........ A63F 13/428; A63F 13/44; A63F 13/79;
G06T 7/20; G06T 2207/30201; G06T
7/251; G06T 2207/30196; G06T
2207/30221; G06T 7/248; G06T 7/73;
G06V 10/62; G06V 40/172; G06V 40/23;
G06V 40/50; G06V 2201/07; G06V 40/10
See application file for complete search history.

(56) References Cited

U.S. PATENT DOCUMENTS

| | | |
|---|---|---|
| 2013/0002866 A1 | 1/2013 | Hampapur et al. |
| 2015/0085111 A1 | 3/2015 | Lavery |
| 2015/0137937 A1* | 5/2015 | Smith ...................... G07C 9/37 340/5.52 |
| 2016/0189391 A1* | 6/2016 | Demartin ............. G01S 5/0072 382/103 |
| 2016/0381328 A1* | 12/2016 | Zhao ...................... G06V 40/23 348/154 |
| 2017/0221272 A1* | 8/2017 | Li .......................... G06T 19/006 |
| 2018/0152667 A1* | 5/2018 | Taine ........................ G06T 7/11 |

FOREIGN PATENT DOCUMENTS

| | | | | |
|---|---|---|---|---|
| CN | 105741312 A | 7/2016 | | |
| CN | 107644204 A | 1/2018 | | |
| CN | 108064185 A | 5/2018 | | |
| JP | 2012033054 A | 2/2012 | | |
| WO | WO-2018217543 A1 * | 11/2018 | ............. | G01B 11/00 |
| WO | WO-2019239242 A1 * | 12/2019 | ......... | G06K 9/00369 |

* cited by examiner

TARGET USER LOCKING METHOD AND ELECTRONIC DEVICE

CROSS-REFERENCE TO RELATED APPLICATIONS

This application is a National Stage of International Application No. PCT/CN2020/106913, filed on Aug. 4, 2020, which claims priority to Chinese Patent Application No. 201910815716.X, filed on Aug. 30, 2019, both of which are hereby incorporated by reference in their entireties.

TECHNICAL FIELD

This application relates to the field of electronic devices, and in particular, to a target user locking method and an electronic device.

BACKGROUND

With the improvement of living standards, people pay increasing attention to their health. Fitness exercise is widely recognized as an effective means to enhance physical fitness, and product solutions related to fitness exercise are also welcomed and liked by an increasing number of consumers. Fitness places are no longer limited to specific places such as gyms, and users can also exercise at home.

For example, large-screen electronic devices such as televisions that are possessed by most households may be used to perform intelligent fitness guidance for users by using an image processing technology. Specifically, a human body image of a target user may be collected by using a camera of an electronic device, a fitness action of the target user is recognized based on the collected human body image, then an action completion quality is evaluated based on a key indicator of the fitness action, and intelligent fitness guidance such as counting actions, pointing out a wrong action, and giving guidance for improvement is provided to the user, so that the user can exercise scientifically at home.

In a process of using the image processing technology to perform fitness guidance, locking (such as recognition or tracking) of the target user is a key to providing the intelligent fitness guidance. However, a large-screen electronic device such as a television in a household is usually disposed in a public area such as a living room, and when a target user exercises, another user such as a family member sitting on a sofa, a family member onlooker, a wallpaper portrait, or a person in a photo frame is likely to interfere with the electronic device in locking on the target user. Consequently, accuracy of locking the target user cannot be ensured.

SUMMARY

Embodiments of this application provide a target user locking method and an electronic device, to ensure accuracy of locking a target user.

To achieve the foregoing objective, the following technical solutions are used in this application:

According to a first aspect of this application, a target user locking method is provided. The method may be applied to an electronic device including a camera, and the method may include: The electronic device determines a target user, tracks the target user through the camera, and collects user image data through the camera in a process of tracking the target user. When determining, based on the collected user image data, that an interfering user exists in a frame, the electronic device collects human poses of all users in the frame through the camera. The frame includes some or all areas of a FOV of the camera. The electronic device determines a motion mode of each user in the frame based on the human poses of all the users in the frame. The electronic device determines, based on the motion mode of each user in the frame, that a user whose motion mode matches a motion mode of a coach in a fitness course in all the users in the frame is the target user, and continues to track the target user through the camera.

In the foregoing technical solution, after determining the target user, the electronic device tracks the target user in a fitness process of the user. In a tracking process, if the interfering user passes in front of the target user, or another interfering person overlaps with the target user, motion mode matching is used to ensure accuracy of tracking the target user, avoiding a case of incorrect transfer of the target user, and improving user experience and completability of a fitness action.

In a possible implementation, that the electronic device determines, based on the motion mode of each user in the frame, that a user whose motion mode matches a motion mode of a coach in a fitness course in all the users in the frame is the target user, and continues to track the target user through the camera includes: The electronic device removes, based on the motion mode of each user in the frame, the interfering user whose motion mode is an interfering motion mode from all the users in the frame. The interfering motion mode includes at least one of a static mode and a quasi-linear motion mode. The electronic device determines that a user whose motion mode matches the motion mode of the coach in the fitness course in all the users except the interfering user in the frame is the target user, and continues to track the target user through the camera. In this way, the interfering user is first filtered out, and then a motion mode of a remaining user in the frame is matched. This reduces a matching calculation amount, and further improves user experience and completability of a fitness action.

In another possible implementation, the determining, based on the collected user image data, that an interfering user exists in a frame includes: The electronic device determines, based on the collected user image data, that a user who interferes with the camera in collecting fitness data of the target user exists in the frame.

In another possible implementation, that the electronic device determines a target user may include: The electronic device collects the user image data through the camera. When determining that one user exists in the frame, the electronic device determines, based on the collected user image data, that the user in the frame is the target user. When determining that a plurality of users exist in the frame, the electronic device prompts the users to complete a target action, collects human poses of all the users in the frame through the camera, and determines that a user whose human pose matches the target action in the frame is the target user. In this way, when a plurality of users exist in the frame, the users are prompted to complete the target action, so that the target user may be determined by recognizing the human poses of all the users in the frame.

In another possible implementation, that the electronic device determines a target user may include: The electronic device collects the user image data through the camera. When determining that one user exists in the frame, the electronic device determines, based on the collected user image data, that the user in the frame is the target user. When determining that a plurality of users exist in the frame, the electronic device collects face images of all the users in the frame through the camera, and determines that a user whose face image matches a stored face image in the frame is the target user. In this way, when a plurality of users exist in the frame, face data of all the users in the frame is collected, so that the target user can be determined by recognizing faces of all the users in the frame. This further improves accuracy of target user recognition.

In another possible implementation, the method may further include: The electronic device collects the face image of the target user, and stores the face image of the target user in association with an account. The determining that a user whose face image matches a stored face image in the frame is the target user may include: The electronic device determines that a user whose face image matches the face image stored in association with the account in the frame is the target user. The face image of the target user is stored in advance to prepare for the target user recognition.

In another possible implementation, the motion mode of the coach in the fitness course includes one or more of the following modes: cross-legged jump, left-right leg jump, hand-assisted squat, side-point punch, lateral knee lift, alternate lunge squat, lunge over-head high-five jump, semi-squat jump, standing with backward leg extension, squat lateral knee lift.

According to a second aspect of this application, a target user locking method is provided. The method may be applied to an electronic device including a camera, and the method may include: The electronic device determines a target user, and tracks the target user through the camera. The electronic device collects user image data through the camera in a process of tracking the target user. When determining, based on the collected user image data, that an interfering user exists in a frame, the electronic device collects feature data of all users in the frame through the camera. The frame includes some or all areas of a field of view (FOV) of the camera. The electronic device determines, based on the feature data of all the users in the frame, that a user whose feature data matches stored feature data in all the users in the frame is the target user, and continues to track the target user through the camera. The feature data includes at least one of the following: a face image, a hairstyle image, and an attire image.

In the foregoing technical solution, after determining the target user, the electronic device tracks the target user in a fitness process of the user. In a tracking process, if the interfering user passes by the front of the target user, or another interfering person overlaps with the target user, user feature matching is used to ensure accuracy of tracking the target user, avoiding a case of incorrectly identifying the target user, and improving user experience and completability of a fitness action.

In a possible implementation, after that the electronic device determines a target user, the method may further include: The electronic device collects the feature data of the target user and stores the feature data.

In another possible implementation, the determining, based on the collected user image data, that an interfering user exists in a frame may include: The electronic device determines, based on the collected user image data, that a user who interferes with the camera in collecting fitness data of the target user exists in the frame.

In another possible implementation, that the electronic device determines a target user may include: The electronic device collects the user image data through the camera. When determining that one user exists in the frame, the electronic device determines, based on the collected user image data, that the user in the frame is the target user. When determining that a plurality of users exist in the frame, the electronic device collects face images of all the users in the frame through the camera, and determines that a user whose face image matches a stored face image in the frame is the target user. In this way, when a plurality of users exist in the frame, face data of all the users in the frame is collected, so that the target user can be determined by recognizing faces of all the users in the frame. This further improves accuracy of target user recognition.

In another possible implementation, the method may further include: The electronic device collects the face image of the target user, and stores the face image of the target user in association with an account. The determining that a user whose face image matches a stored face image in the frame is the target user includes: The electronic device determines that a user whose face image matches the face image stored in association with the account in the frame is the target user. The face image of the target user is stored in advance to prepare for the target user recognition.

In another possible implementation, that the electronic device determines a target user may include: The electronic device collects the user image data through the camera. When determining that one user exists in the frame, the electronic device determines, based on the collected user image data, that the user in the frame is the target user. When determining that a plurality of users exist in the frame, the electronic device prompts the users to complete a target action, collects human poses of all the users in the frame through the camera, and determines that a user whose human pose matches the target action in the frame is the target user. In this way, when a plurality of users exist in the frame, the users are prompted to complete the target action, so that the target user may be determined by recognizing the human poses of all the users in the frame.

According to a third aspect of this application, a target user locking method is provided. The method may be applied to an electronic device including a camera, and the method may include: The electronic device determines a target user, and tracks the target user through the camera. The electronic device determines a wearable device of the target user. The wearable device of the target user establishes a wireless connection to the electronic device. The electronic device collects user image data through the camera in a process of tracking the target user. When determining, based on the collected user image data, that an interfering user exists in a frame, the electronic device collects human poses of all users in the frame through the camera. The frame includes some or all areas of a FOV of the camera. The electronic device determines motion data of each user in the frame based on the human poses of all the users in the frame. The electronic device determines, based on the motion data of each user in the frame, that a user whose motion data matches motion data received from the wearable device of the target user in all the users in the frame is the target user, and continues to track the target user through the camera.

In the foregoing technical solution, after determining the target user, the electronic device tracks the target user in a fitness process of the user. In a tracking process, if the interfering user passes by the front of the target user, or another interfering person overlaps with the target user, matching of the data collected by the wearable device worn by the target user is used to ensure accuracy of tracking the target user, avoid a case of incorrect transfer of the target user, and improve user experience and completability of a fitness action.

In another possible implementation, the determining, based on the collected user image data, that an interfering user exists in a frame may include: The electronic device determines, based on the collected user image data, that a user who interferes with the camera in collecting fitness data of the target user exists in the frame.

In another possible implementation, before that the electronic device determines a target user, the method may further include: The electronic device pairs with a first wearable device and establishes a wireless connection, so that the first wearable device transmits the collected motion data of the user to the electronic device. That the electronic device determines a target user includes: The electronic device prompts the users to complete a target action, and collects human poses of all the users in the frame through the camera. The electronic device determines, based on the human poses of all the users in the frame, that a user whose human pose matches the target action in the frame is the target user. That the electronic device determines a wearable device of the target user includes: The electronic device determines, based on the human pose of the target user, the motion data of the target user, and when the received motion data from the first wearable device matches the motion data of the target user, determines that the first wearable device is the wearable device of the target user. In this way, the users are prompted to complete the target action, so that the target user may be determined by recognizing the human poses of all the users in the frame. In addition, the wearable device of the target user may be determined by matching the motion data of the target user and receiving the motion data collected by the wearable device.

In another possible implementation, that the electronic device determines a target user may include: The electronic device collects the user image data through the camera. When determining that one user exists in the frame, the electronic device determines, based on the collected user image data, that the user in the frame is the target user. When determining that a plurality of users exist in the frame, the electronic device collects face images of all the users in the frame through the camera, and determines that a user whose face image matches a stored face image in the frame is the target user. In this way, when a plurality of users exist in the frame, face data of all the users in the frame is collected, so that the target user can be determined by recognizing faces of all the users in the frame. This further improves accuracy of target user recognition.

In another possible implementation, the method further includes: The electronic device collects the face image of the target user, and stores the face image of the target user in association with an account. The determining that a user whose face image matches a stored face image in the frame is the target user includes: The electronic device determines that a user whose face image matches the face image stored in association with the account in the frame is the target user. The face image of the target user is stored in advance to prepare for the target user recognition.

In another possible implementation, that the electronic device determines a target user may include: The electronic device collects the user image data through the camera. When determining that one user exists in the frame, the electronic device determines, based on the collected user image data, that the user in the frame is the target user. When determining that a plurality of users exist in the frame, the electronic device prompts the users to complete a target action, collects human poses of all the users in the frame through the camera, and determines that a user whose human pose matches the target action in the frame is the target user. In this way, when a plurality of users exist in the frame, the users are prompted to complete the target action, so that the target user may be determined by recognizing the human poses of all the users in the frame.

In another possible implementation, that the electronic device determines a wearable device of the target user may include: The electronic device determines that a wearable device associated with the electronic device is the wearable device of the target user. That the wearable device is associated with the electronic device includes: The wearable device and the electronic device log in to a same account, a login account of the wearable device is a contact of a login account of the electronic device, and a login account of the wearable device is the same as a login account of a fitness application of the electronic device.

According to a fourth aspect of this application, an electronic device is provided. The electronic device may include a processor, a memory, a display, and a camera. The processor is coupled to the display, the camera, and the memory, the memory is configured to store computer program code, the computer program code includes computer software instructions, and when the computer software instructions are executed by the electronic device, the electronic device is enabled to perform the following operations: determining a target user, and tracking the target user through the camera; collecting user image data through the camera in a process of tracking the target user; when determining, based on the collected user image data, that an interfering user exists in a frame, collecting human poses of all users in the frame through the camera, where the frame includes some or all areas of a FOV of the camera; determining a motion mode of each user in the frame based on the human poses of all the users in the frame; and determining, based on the motion mode of each user in the frame, that a user whose motion mode matches a motion mode of a coach in a fitness course in all the users in the frame is the target user, and continuing to track the target user through the camera.

In a possible implementation, the determining, based on the motion mode of each user in the frame, that a user whose motion mode matches a motion mode of a coach in a fitness course in all the users in the frame is the target user, and continuing to track the target user through the camera includes: removing, based on the motion mode of each user in the frame, the interfering user whose motion mode is an interfering motion mode from all the users in the frame, where the interfering motion mode includes at least one of a static mode and a quasi-linear motion mode; and determining, by the electronic device, that a user whose motion mode matches the motion mode of the coach in the fitness course in all the users except the interfering user in the frame is the target user, and continuing to track the target user through the camera.

In another possible implementation, the determining, based on the collected user image data, that an interfering user exists in a frame includes: determining, based on the collected user image data, that a user who interferes with the camera in collecting fitness data of the target user exists in the frame.

In another possible implementation, the determining a target user includes: collecting the user image data through the camera; and when determining that one user exists in the frame, determining, based on the collected user image data, that the user in the frame is the target user; or when determining that a plurality of users exist in the frame, prompting the users to complete a target action, collecting human poses of all the users in the frame through the camera, and determining that a user whose human pose matches the target action in the frame is the target user.

In another possible implementation, the determining a target user includes: collecting the user image data through the camera; and when determining that one user exists in the frame, determining, based on the collected user image data, that the user in the frame is the target user; or when determining that a plurality of users exist in the frame, collecting face images of all the users in the frame through the camera, and determining that a user whose face image matches a stored face image in the frame is the target user.

In another possible implementation, when the computer software instructions are executed by the electronic device, the electronic device is further enabled to perform the following operations: collecting the face image of the target user, and storing the face image of the target user in association with an account. The determining that a user whose face image matches a stored face image in the frame is the target user includes: determining that a user whose face image matches the face image stored in association with the account in the frame is the target user.

In another possible implementation, the motion mode of the coach in the fitness course includes one or more of the following modes: cross-legged jump, left-right leg jump, hand-assisted squat, side-point punch, lateral knee lift, alternate lunge squat, lunge over-head high-five jump, semi-squat jump, standing with backward leg extension, squat lateral knee lift.

According to a fifth aspect of this application, an electronic device is provided. The electronic device may include a processor, a memory, a display, and a camera. The processor is coupled to the display, the camera, and the memory, the memory is configured to store computer program code, the computer program code includes computer software instructions, and when the computer software instructions are executed by the electronic device, the electronic device is enabled to perform the following operations: determining a target user, and tracking the target user through the camera; collecting user image data through the camera in a process of tracking the target user; when determining, based on the collected user image data, that an interfering user exists in a frame, collecting feature data of all users in the frame through the camera, where the frame includes some or all areas of a FOV of the camera; and determining, based on the feature data of all the users in the frame, that a user whose feature data matches stored feature data in all the users in the frame is the target user, and continuing to track the target user through the camera, where the feature data includes at least one of the following: a face image, a hairstyle image, and an attire image.

In a possible implementation, when the computer software instructions are executed by the electronic device, the electronic device is further enabled to perform the following operation: collecting the feature data of the target user and storing the feature data.

In another possible implementation, the determining, based on the collected user image data, that an interfering user exists in a frame includes: determining, based on the collected user image data, that a user who interferes with the camera in collecting fitness data of the target user exists in the frame.

In another possible implementation, the determining a target user includes: collecting the user image data through the camera; and when determining that one user exists in the frame, determining, based on the collected user image data, that the user in the frame is the target user; or when determining that a plurality of users exist in the frame, collecting face images of all the users in the frame through the camera, and determining that a user whose face image matches a stored face image in the frame is the target user.

In another possible implementation, when the computer software instructions are executed by the electronic device, the electronic device is further enabled to perform the following operations: collecting the face image of the target user, and storing the face image of the target user in association with an account. The determining that a user whose face image matches a stored face image in the frame is the target user includes: determining that a user whose face image matches the face image stored in association with the account in the frame is the target user.

In another possible implementation, the determining a target user includes: collecting the user image data through the camera; and when determining that one user exists in the frame, determining, based on the collected user image data, that the user in the frame is the target user; or when determining that a plurality of users exist in the frame, prompting the users to complete a target action, collecting human poses of all the users in the frame through the camera, and determining that a user whose human pose matches the target action in the frame is the target user.

According to a sixth aspect of this application, an electronic device is provided. The electronic device may include a processor, a memory, a display, and a camera. The processor is coupled to the display, the camera, and the memory, the memory is configured to store computer program code, the computer program code includes computer software instructions, and when the computer software instructions are executed by the electronic device, the electronic device is enabled to perform the following operations: determining a target user, and tracking the target user through the camera; determining a wearable device of the target user, where the wearable device of the target user establishes a wireless connection to the electronic device; collecting user image data through the camera in a process of tracking the target user; when determining, based on the collected user image data, that an interfering user exists in a frame, collecting human poses of all users in the frame through the camera, where the frame includes some or all areas of a FOV of the camera; determining motion data of each user in the frame based on the human poses of all the users in the frame; and determining, based on the motion data of each user in the frame, that a user whose motion data matches motion data received from the wearable device of the target user in all the users in the frame is the target user, and continuing to track the target user through the camera.

In a possible implementation, the determining, based on the collected user image data, that an interfering user exists in a frame includes: determining, based on the collected user image data, that a user who interferes with the camera in collecting fitness data of the target user exists in the frame.

In another possible implementation, when the computer software instructions are executed by the electronic device, the electronic device is further enabled to perform the following operations: pairing with a first wearable device and establishing a wireless connection, so that the first wearable device transmits the collected motion data of the user to the electronic device. The determining a target user includes: prompting the users to complete a target action, and collecting human poses of all the users in the frame through the camera; and determining, based on the human poses of all the users in the frame, that a user whose human pose matches the target action in the frame is the target user. The determining a wearable device of the target user includes: determining, based on the human pose of the target user, the motion data of the target user, and when the received motion data from the first wearable device matches the motion data of the target user, determining that the first wearable device is the wearable device of the target user.

In another possible implementation, the determining a target user includes: collecting the user image data through the camera; and when determining that one user exists in the frame, determining, based on the collected user image data, that the user in the frame is the target user; or when determining that a plurality of users exist in the frame, collecting face images of all the users in the frame through the camera, and determining that a user whose face image matches a stored face image in the frame is the target user.

In another possible implementation, when the computer software instructions are executed by the electronic device, the electronic device is further enabled to perform the following operations: collecting the face image of the target user, and storing the face image of the target user in association with an account. The determining that a user whose face image matches a stored face image in the frame is the target user includes: The electronic device determines that a user whose face image matches the face image stored in association with the account in the frame is the target user.

In another possible implementation, the determining a target user includes: collecting the user image data through the camera; and when determining that one user exists in the frame, determining, based on the collected user image data, that the user in the frame is the target user; or when determining that a plurality of users exist in the frame, prompting the users to complete a target action, collecting human poses of all the users in the frame through the camera, and determining that a user whose human pose matches the target action in the frame is the target user.

In another possible implementation, the determining a wearable device of the target user includes: determining that a wearable device associated with the electronic device is the wearable device of the target user. That the wearable device is associated with the electronic device includes: The wearable device and the electronic device log in to a same account, a login account of the wearable device is a contact of a login account of the electronic device, and a login account of the wearable device is the same as a login account of a fitness application of the electronic device.

According to a seventh aspect of this application, a computer-readable storage medium is provided, and includes computer software instructions. When the computer software instructions are run on an electronic device, the electronic device is enabled to perform the target user locking method according to any one of the first aspect and the possible implementations of the first aspect, the second aspect and the possible implementations of the second aspect, and the third aspect and the possible implementations of the third aspect.

According to an eighth aspect of this application, a computer program product is provided. When the computer program product runs on a computer, the computer is enabled to perform the target user locking method according to any one of the first aspect and the possible implementations of the first aspect, the second aspect and the possible implementations of the second aspect, and the third aspect and the possible implementations of the third aspect.

According to a ninth aspect of this application, an apparatus is provided. The apparatus has a function of implementing behavior of the electronic device in the method according to the first aspect, the second aspect, or the third aspect. The function may be implemented by hardware, or may be implemented by hardware executing corresponding software. The hardware or the software includes one or more modules corresponding to the function, for example, a determining unit or module, a collection unit or module, or a tracking unit or module.

According to a tenth aspect of this application, a chip system is provided. The chip system is applied to an electronic device; and the chip system includes an interface circuit and a processor. The interface circuit and the processor are interconnected through a line. The interface circuit is configured to receive a signal from a memory of the electronic device, and send the signal to the processor. The signal includes computer instructions stored in the memory. When the processor executes the computer instructions, the chip system performs the target user locking method according to any one of the first aspect and the possible implementations of the first aspect, the second aspect and the possible implementations of the second aspect, and the third aspect and the possible implementations of the third aspect.

It should be understood that descriptions of technical features, technical solutions, beneficial effects, or similar words in this application do not imply that all features and advantages can be implemented in any individual embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one same embodiment. Further, the technical features, the technical solutions, and the beneficial effects described in the embodiments may be combined in any appropriate manner. A person skilled in the art may understand that an embodiment may be implemented without one or more specific technical features, technical solutions, or beneficial effects in a specific embodiment. In other embodiments, additional technical features and beneficial effects may be further identified in a specific embodiment that does not reflect all the embodiments.

DESCRIPTION OF EMBODIMENTS

Based on an electronic device such as a television in a household, an image processing technology may be used to provide intelligent fitness guidance for a user, so that the user can also exercise scientifically at home. When the image processing technology is used to perform the fitness guidance, locking (such as recognition or tracking) of a target user by the electronic device is a key to providing the intelligent fitness guidance. For example, when the user starts to exercise, the electronic device may recognize a user in a specific area such as a center of a frame as the target user. Then, a human body detection algorithm and a target tracking algorithm are used to track the target user. In a tracking process, a human body image of the target user is collected. Based on the collected human body image, a fitness action of the target user is recognized, and fitness guidance such as counting the actions, pointing out a wrong action, and giving guidance for improvement is completed.

However, the foregoing process cannot ensure accuracy of locking the target user. For example, when a plurality of users exist in the specific area, it is difficult to determine the target user. When the target user temporarily leaves a field of view (FOV) of a camera and returns to the FOV of the camera again, if the electronic device has locked another user as the target user, it is difficult to switch the target user back to a previous user. When an interfering person overlaps with the target user (for example, passing by the front of the target user), a problem of incorrect tracking is prone to occur in the foregoing process. All of these problems may affect user experience of intelligent fitness based on the electronic device, and sometimes the user cannot even finish a complete set of fitness actions.

Embodiments of this application provide a target user locking method. The method may be applied to an electronic device including a display and a camera. In the method, the electronic device can accurately lock a target user, so as to accurately recognize and track the target user, and provide intelligent fitness guidance for the target user. This improves user experience when a user performs intelligent fitness by using the electronic device.

For example, the electronic device in the embodiments of this application may be a television, a tablet computer, a projector, a mobile phone, a desktop computer, a laptop computer, a handheld computer, a notebook computer, an ultra-mobile personal computer (UMPC), a netbook, or a device including a display and a camera, such as a cellular phone, a personal digital assistant (PDA), or an augmented reality (AR)/virtual reality (VR) device. A specific form of the electronic device is not specifically limited in the embodiments of this application.

Figure 1:
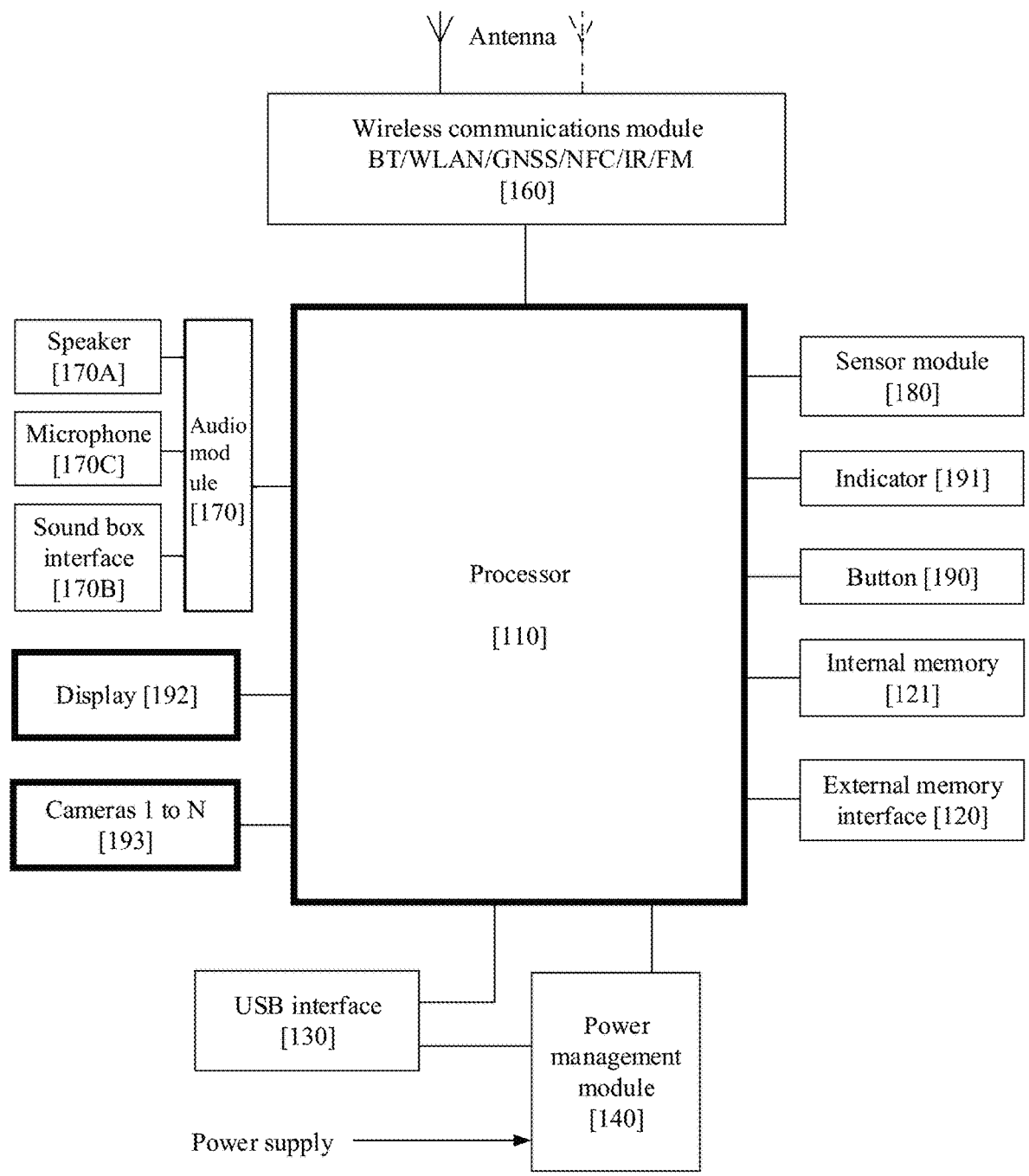
FIG. 1 is a schematic diagram of a structure of an electronic device according to an embodiment of this application.

FIG. 1 is a schematic diagram of a structure of an electronic device according to an embodiment of this application. As shown in FIG. 1, the electronic device may include a processor 110, an external memory interface 120, an internal memory 121, a universal serial bus (USB) interface 130, a power management module 140, an antenna, a wireless communications module 160, an audio module 170, a speaker 170A, a sound box interface 170B, a microphone 170C, a sensor module 180, a button 190, an indicator 191, a display 192, a camera 193, and the like. The sensor module 180 may include a distance sensor, an optical proximity sensor, a fingerprint sensor, a temperature sensor, a touch sensor, an ambient light sensor, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU) and/or the like. Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a USB interface, and/or the like.

The power management module 140 is configured to connect to a power supply. The power management module 140 may be further connected to the processor 110, the internal memory 121, the display 192, the camera 193, the wireless communications module 160, and the like. The power management module 140 receives an input of the power supply and supplies power to the processor 110, the internal memory 121, the display 192, the camera 193, the wireless communications module 160, and the like. In some embodiments, the power management module 140 may alternatively be disposed in the processor 110.

A wireless communication function of the electronic device may be implemented by using the antenna, the wireless communications module 160, or the like. The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device.

The wireless communications module 160 may be one or more components integrating at least one communications processor module. The wireless communications module 160 receives an electromagnetic wave through the antenna, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna. In some embodiments, the antenna of the electronic device is coupled to the wireless communications module 160, so that the electronic device may communicate with a network and another device by using a wireless communications technology.

The electronic device implements a display function by using the GPU, the display 192, the application processor, and the like. The GPU is a microprocessor for image processing, and is connected to the display 192 and the application processor. The GPU is configured to perform mathematical and geometric calculation, and render an image. The processor 110 may include one or more GPUs that execute program instructions to generate or change display information.

The display 192 is configured to display an image, a video, and the like. The display 192 includes a display panel. The display panel may be a liquid crystal display (LCD), an organic light-emitting diode (OLED), an active-matrix organic light emitting diode (AMOLED), a flex light-emitting diode (FLED), a mini-LED, a micro-LED, a micro-OLED, a quantum dot light emitting diode (QLED), or the like.

The electronic device may implement a photographing function by using the ISP, the camera 193, the video codec, the GPU, the display 192, the application processor, and the like. The ISP is configured to process data fed back by the camera 193. In some embodiments, the ISP may be disposed in the camera 193.

Figure 3A:
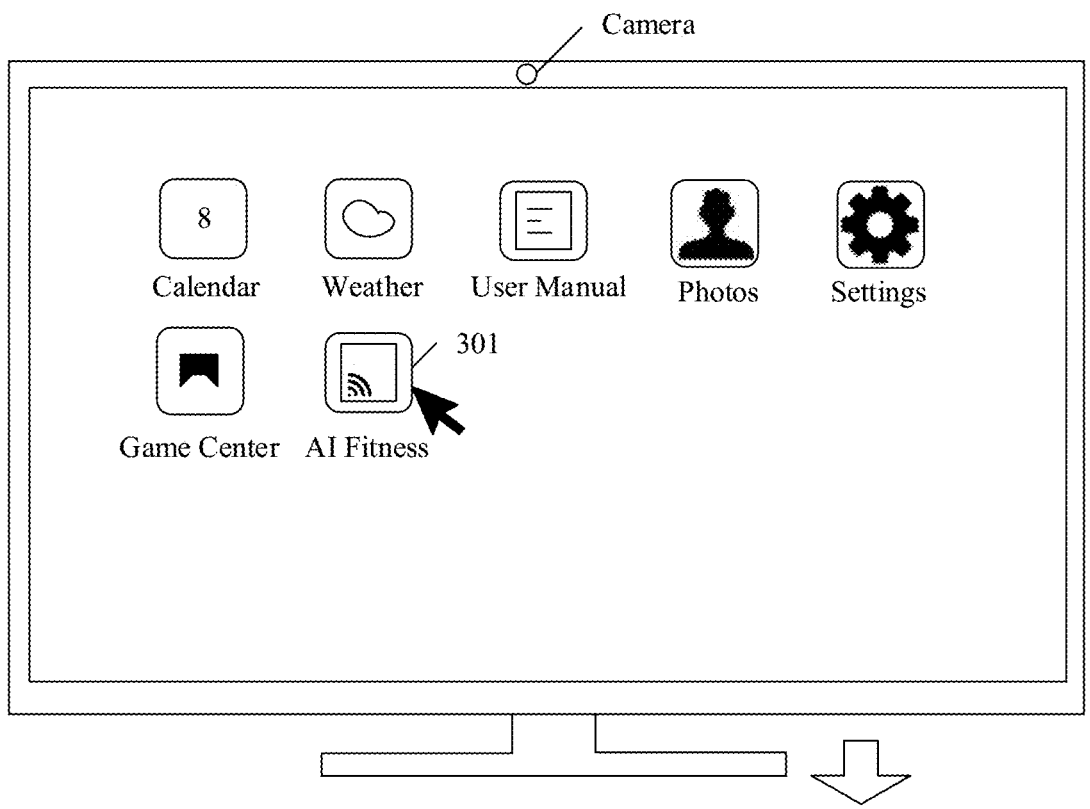
FIG. 3A and FIG. 3B are a schematic diagram of a display interface according to an embodiment of this application.

The camera 193 is configured to capture a static image or a video. An optical image of an object is generated through the lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1. For example, the electronic device is a television. As shown in FIG. 3A, the camera 193 may be disposed at an upper edge of the display 192 of the television. Certainly, a location of the camera 193 on the electronic device is not limited in this embodiment of this application.

Alternatively, the electronic device may not include a camera, in other words, the camera 193 is not disposed in the electronic device (for example, the television). The electronic device may be externally connected to the camera 193 through an interface (for example, the USB interface 130). The external camera 193 may be fastened to the electronic device by using an external fastener (for example, a camera support with a clip). For example, the external camera 193 may be fastened to an edge such as an upper side edge of the display 192 of the electronic device by using the external fastener.

The digital signal processor is configured to process a digital signal, and may process another digital signal in addition to the digital image signal. For example, when the electronic device selects a frequency, the digital signal processor is configured to perform Fourier transform and the like on frequency energy. The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device may be implemented through the NPU, for example, image recognition, facial recognition, speech recognition, and text understanding.

The external memory interface 120 may be configured to connect to an external memory card, for example, a micro SD card, to extend a storage capability of the electronic device. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121 to execute various function applications of the electronic device and data processing. The internal memory 121 may include a program storage area and a data storage area. The program storage area may store an operating system, an application required by at least one function (such as a sound playing function or an image playing function), and the like. The data storage area may store data (such as audio data) created during use of the electronic device, and the like. In addition, the internal memory 121 may include a high-speed random access memory, and may further include a non-volatile memory such as at least one magnetic disk storage device, a flash memory, or a universal flash storage (UFS).

The electronic device may implement an audio function such as music playing or recording by using the audio module 170, the speaker 170A, the microphone 170C, the sound box interface 170B, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110. The speaker 170A, also referred to as a "horn", is configured to convert an audio electrical signal into a sound signal. The microphone 170C, also referred to as a "mike" or a "microphone", is configured to convert a sound signal into an electrical signal.

The sound box interface 170B is configured to connect to a wired sound box. The sound box interface 170B may be the USB interface 130, or may be a 3.5 mm open mobile terminal platform (OMTP) standard interface, or a cellular telecommunications industry association of the USA (CTIA) standard interface.

The button 190 includes a power button, a volume button, and the like. The button 190 may be a mechanical button, or may be a touch-sensitive button. The electronic device may receive a key input, and generate a key signal input related to a user setting and function control of the electronic device.

The indicator 191 may be an indicator light, and may be configured to indicate that the electronic device is in a power-on mode, a standby mode, a power-off mode, or the like. For example, if the indicator light is off, it may be indicated that the electronic device is in the power-off mode;

if the indicator light is green or blue, it may be indicated that the electronic device is in the power-on mode; and if the indicator light is red, it may be indicated that the electronic device is in the standby mode.

In some embodiments, the electronic device such as the television may be equipped with a remote control. The remote control is configured to control the electronic device. The remote control may include a plurality of buttons, such as a power button, a volume button, and a plurality of other selection buttons. The button on the remote control may be a mechanical button, or may be a touch button. The remote control may receive a key input, generate a key signal input related to a user setting and function control of the electronic device, and send a corresponding control signal to the electronic device, to control the electronic device. For example, the remote control may send a control signal to the electronic device through an infrared signal or the like. The remote control may further include a battery storage cavity that is configured to mount a battery and supply power to the remote control.

It may be understood that the structure shown in this embodiment of this application does not constitute a specific limitation on the electronic device. The electronic device may have more or fewer components than those shown in FIG. 1, may combine two or more components, or may have a different component configuration. For example, the electronic device may further include a component such as a sound box. Various components shown in FIG. 1 may be implemented in hardware, software, or a combination of hardware and software that includes one or more signal processing or application-specific integrated circuits.

All methods in the following embodiments may be implemented in the electronic device having the foregoing hardware structure. In the following embodiment, an example in which the electronic device is a television is used to describe the method in the embodiments of this application.

Figure 2:
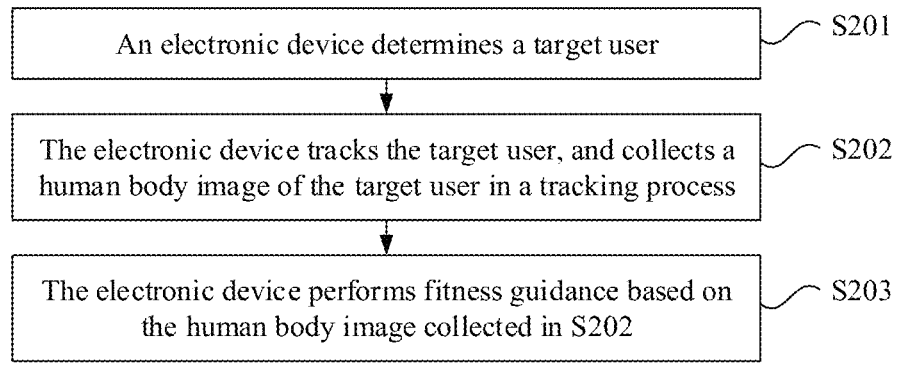
FIG. 2 is a schematic flowchart of a target user locking method according to an embodiment of this application.

FIG. 2 is a schematic flowchart of a target user locking method according to an embodiment of this application. As shown in FIG. 2, the method may include the following steps.

S201: An electronic device determines a target user.

The target user is a user who receives fitness guidance by using the electronic device.

For example, an application used to perform fitness guidance may be installed on the electronic device. When the user wants to exercise, the application on the electronic device may provide intelligent fitness guidance for the user. For example, the electronic device is a television. The application used to perform fitness guidance may be an "AI Fitness" application. When the user wants to use the television for fitness at home, the user may open the "AI Fitness" application on the television. For example, as shown in FIG. 3A, the user may perform, by using a remote control, an operation on an icon 301 of the "AI Fitness" application on an interface displayed on the television. In response to the operation, the television may open the "AI Fitness" application, and display an interface of the "AI Fitness" application. For example, the interface of the "AI Fitness" application may be an interface 302 shown in FIG. 3B. The "AI Fitness" application may provide the user with different types of fitness guidance. For example, the interface 302 of the "AI Fitness" application includes entries of various fitness guidance courses, such as an entry 303 of a course card 1, and the user may perform an operation on a corresponding entry based on a requirement, to select a desired fitness course for fitness guidance.

It may be understood that, when performing fitness guidance, the electronic device first needs to recognize a user who wants fitness guidance, in other words, needs to determine the target user. In this embodiment, the electronic device may determine the target user in the following manner:

Manner 1: The electronic device may recognize a user's biometric feature such as a face, to determine the target user.

For example, the electronic device is a television. When the user wants fat burning guidance, the user may select a corresponding guidance course on the interface 302 of the "AI Fitness" application shown in FIG. 3B. For example, the user may perform an operation on the entry 303 of the course card 1 on the interface 302 of the "AI Fitness" application by using the remote control. In response to the operation, the television may determine the target user.

Figure 4A:
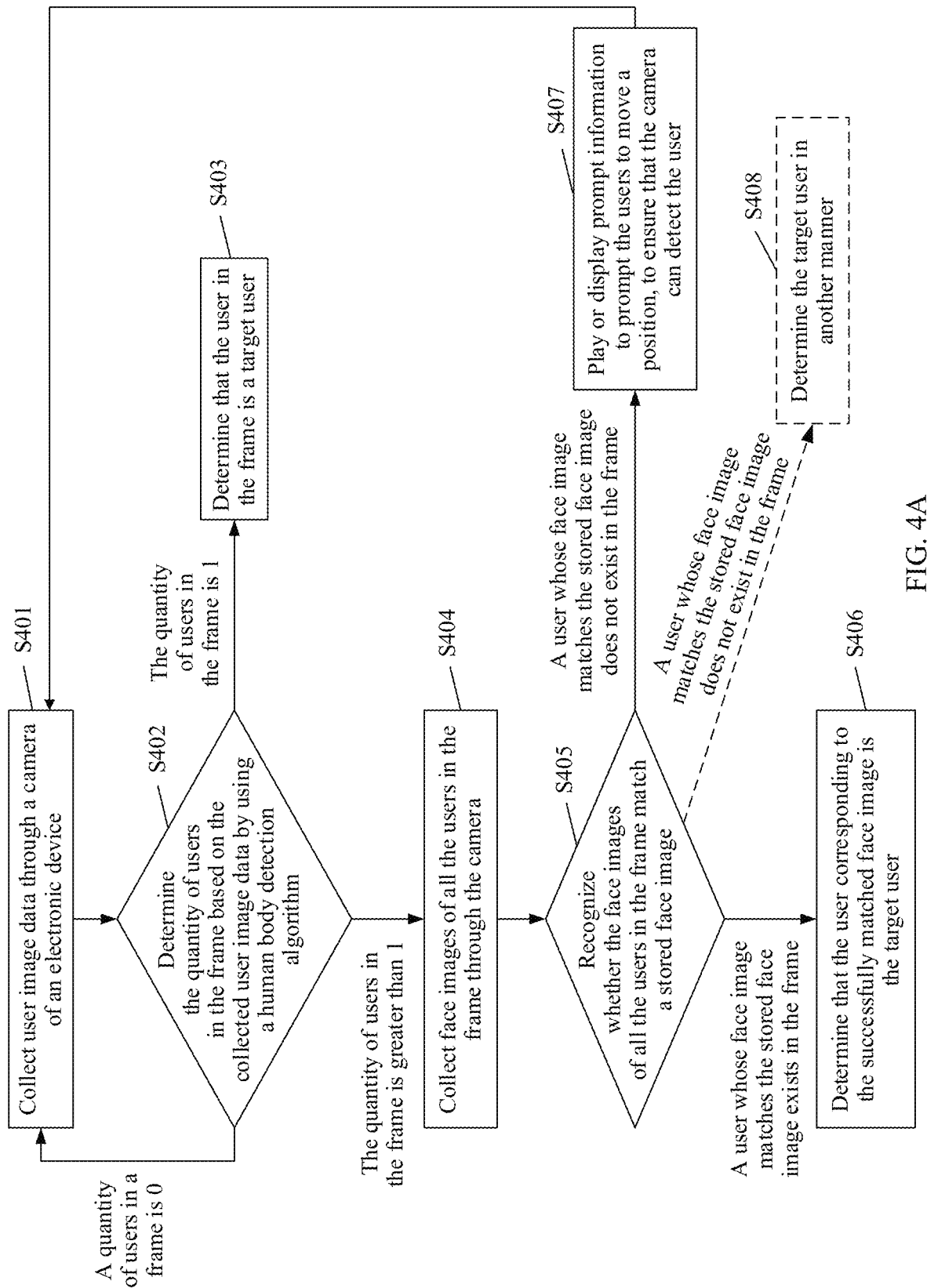
FIG. 4A is a schematic flowchart of another target user locking method according to an embodiment of this application.

In Manner 1, S201, that is, a process in which the electronic device determines the target user, may include steps shown in FIG. 4A. The electronic device opens a camera of the electronic device, and collects user image data through the camera (that is, performs S401). The electronic device determines a quantity of users in a frame based on the collected user image data by using a human body detection algorithm (that is, performs S402). The frame includes some or all areas of a FOV of the camera. If the quantity of users in the frame is 0, S401 is performed again. If the quantity of users in the frame is 1, the electronic device may determine that the user in the frame is the target user (that is, perform S403).

If the quantity of users in the frame is greater than 1, the electronic device collects face images of all the users in the frame through the camera (that is, performs S404). The electronic device recognizes whether the face images of all the users in the frame match a stored face image (that is, performs S405). If the electronic device recognizes a user whose face image matches the stored face image in the frame, the electronic device determines that the user corresponding to the successfully matched face image is the target user (that is, performs S406). A quantity of the target user may be one, or may be two or more. For example, if the electronic device determines that one user whose face image matches the stored face image exists in the frame, the electronic device determines that the user is the target user. If the electronic device determines that a plurality of (such as two or more) users whose face images match the stored face image exist in the frame, the electronic device may determine that all the plurality of users are the target users, or the electronic device may determine the target user from the plurality of users in Manner 2 or Manner 3 below.

If the electronic device does not recognize, from the collected face images of all the users in the frame, a face image that matches the stored face image, the user who wants fitness guidance may not be in the frame. Therefore, in a possible implementation, the electronic device may play or display prompt information to prompt the users to change a position, so as to ensure that the camera can detect the user (that is, perform S407). In addition, the electronic device may perform S401 again. Alternatively, the electronic device may not store a face image of the user who wants to exercise. In this case, in another possible implementation, the electronic device may determine the target user in another manner, for example, in Manner 2 or Manner 3 below (that is, perform S408). Certainly, in this implementation, the electronic device may also display prompt information to prompt the user to input the face image, so that the electronic device can recognize the user during next fitness exercise.

In this embodiment, the face image stored in the electronic device may be entered and stored by the user when fitness guidance is performed based on the electronic device for the first time. For example, when the user uses the electronic device to perform fitness guidance for the first time, the electronic device may prompt the user to create a personal account and collect face data. In this way, the user may create the personal account on the electronic device according to the prompt, and the electronic device collects the face image of the user. After the collection succeeds, the electronic device may store the collected face data. The face image may be stored in association with the created personal account. One or more face images may be stored in association with a same personal account. Face images stored in association with different personal accounts may be the same or different. In other words, S405 may be specifically: The electronic device may recognize whether the face images of all the users in the frame match a face image stored in association with a personal account that is currently logged in to.

Figure 3B:
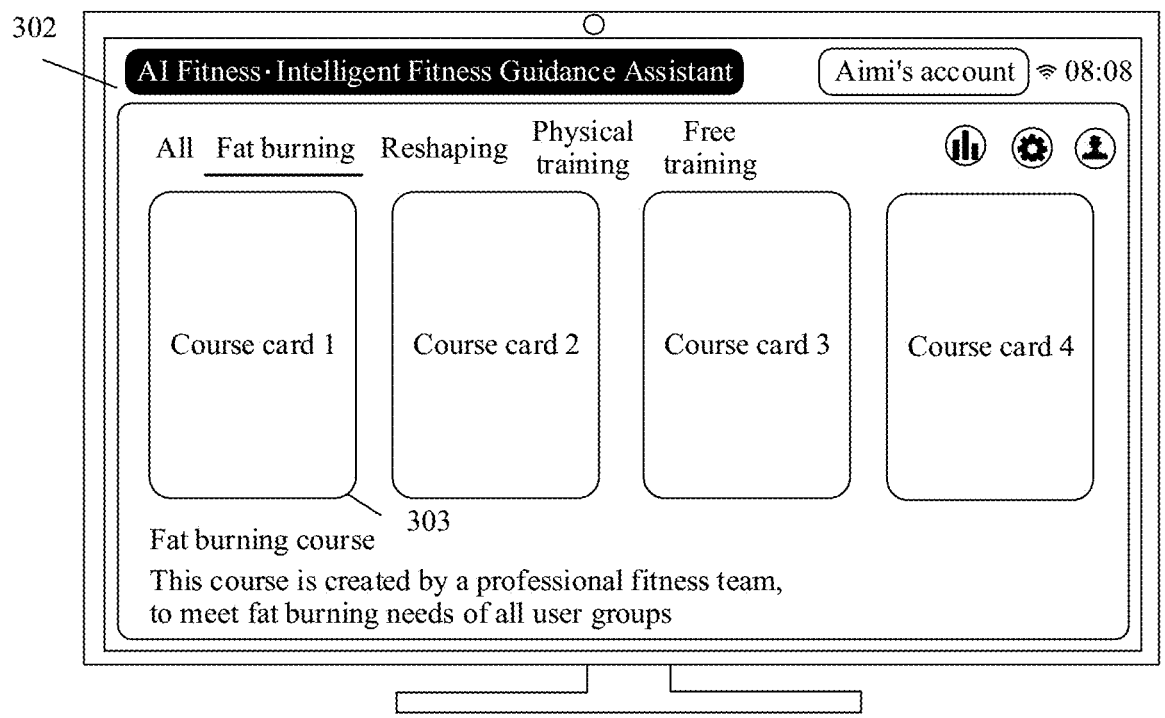
Figure 4B:
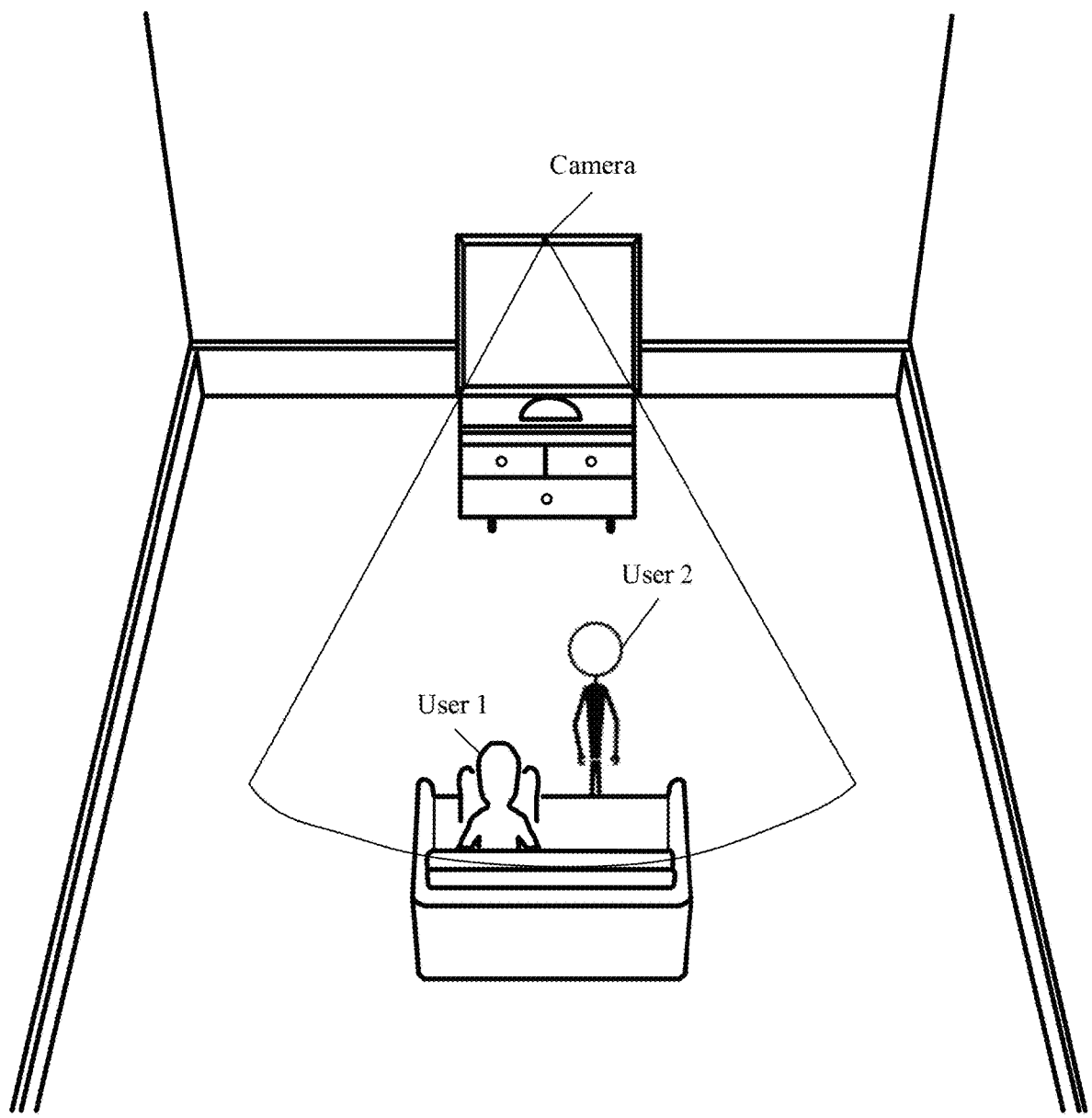
FIG. 4B is a schematic diagram of a target user recognition scenario according to an embodiment of this application.

An example in which the electronic device is a television is used with reference to the example shown in FIG. 3A and FIG. 3B. After the user performs an operation on the entry 303 of the course card 1 on the interface 302 of the "AI Fitness" application by using the remote control, as shown in FIG. 4B, the television may collect the face images of all the users in the frame (for example, a fan-shaped range shown in FIG. 4B) through the camera. As shown in FIG. 4B, the fan-shaped range includes a user 1 and a user 2. The user 1 sits on a sofa, the user 2 is a user preparing to exercise, and the television stores a face image of the user 2. After the face images of all the users, that is, the user 1 and the user 2, in the frame are collected, the television may recognize whether the face images of the user 1 and the user 2 match the stored face image. The television may match that the face image of the user 2 matches the stored face image. In this case, it is determined that the user 2 is the target user.

Manner 2: The electronic device may recognize a human pose of the user, to determine the target user.

As the example in Manner 1, the electronic device may determine the target user after receiving an operation performed by the user on the entry 303 of the course card 1 on the interface 302 of the "AI Fitness" application.

Figure 5A:
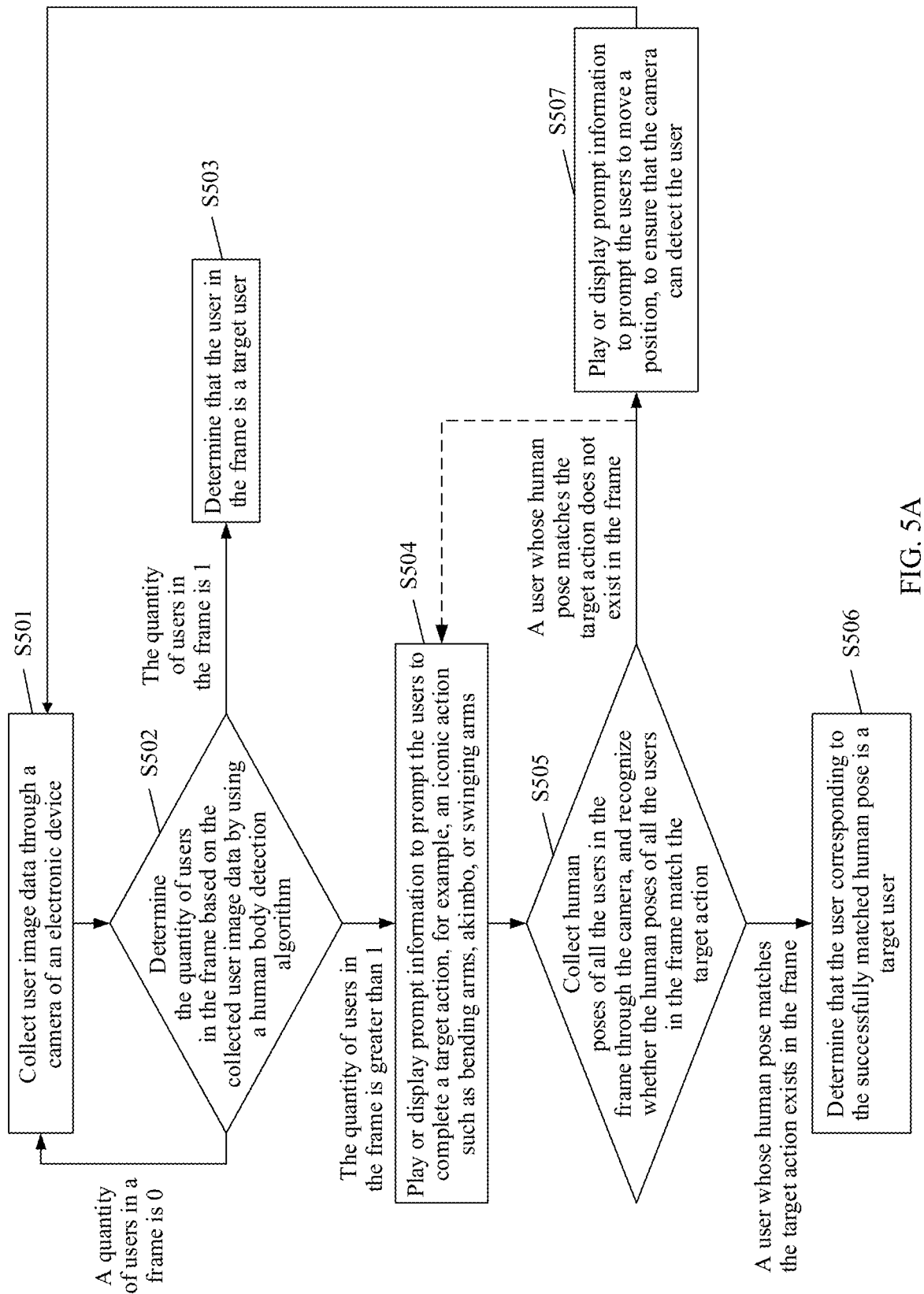
FIG. 5A is a schematic flowchart of still another target user locking method according to an embodiment of this application.

In Manner 2, S201, that is, a process in which the electronic device determines the target user, may include the steps shown in FIG. 5A. The electronic device opens a camera of the electronic device, and collects user image data through the camera (that is, performs S501). The electronic device determines a quantity of users in a frame based on the collected user image data by using a human body detection algorithm (that is, performs S502). If the quantity of users in the frame is 0, S501 is performed again. If the quantity of users in the frame is 1, the electronic device may determine that the user in the frame is the target user (that is, perform S503).

If the quantity of users in the frame is greater than 1, the electronic device may play or display prompt information to prompt the users to complete a target action, for example, an iconic action such as stretching arms to both sides, bending arms, akimbo, swinging arms, nodding, or kicking leg (that is, perform S504). A user who needs fitness guidance completes the target action according to the prompt, but a user who does not need fitness guidance does not complete the target action according to the prompt. The electronic device collects human poses of all the users in the frame through the camera, and recognizes, by using a human pose estimation algorithm, whether the human poses of all the users in the frame match the target action (that is, performs S505). The human pose estimation algorithm is an algorithm for detecting a human key point by training a neural network model, and describing a human pose (pose) based on the human key point.

If the electronic device recognizes that a user whose human pose matches the target action exists in the frame, the electronic device determines that the user corresponding to the successfully matched human pose is the target user (that is, performs S506). A quantity of the target user may be one, or may be two or more. For example, if the electronic device determines that one user whose human pose matches the target action exists in the frame, the electronic device determines that the user is the target user. If the electronic device determines that a plurality of (such as two or more) users whose human poses match the target action exist in the frame, the electronic device may determine that all the plurality of users are the target users. Alternatively, if a course selected by the user is allowed to be performed by only one person, that is, a single-person mode, the electronic device may play or display prompt information to prompt another user to avoid, perform S505 again until it is determined that only one user whose human pose matches the target action exists in the frame, and determine that the user is the target user.

If the electronic device does not recognize, from the collected human poses of all the users in the frame, a human pose that matches the target action, the user who wants fitness guidance may not be in the frame. Therefore, in a possible implementation, the electronic device may play or display prompt information to prompt the users to change positions, so as to ensure that the camera can detect the user (that is, perform S507). In addition, the electronic device may perform S501 again. Alternatively, the action of the user may not be standard. In another possible implementation, the electronic device may perform S504 again to indicate to the user to complete the target action again. It can be understood that the user only needs to complete a specified action, so that the electronic device can automatically complete determining of the target user. This conveniently implements determining of the target user.

Figure 5B:
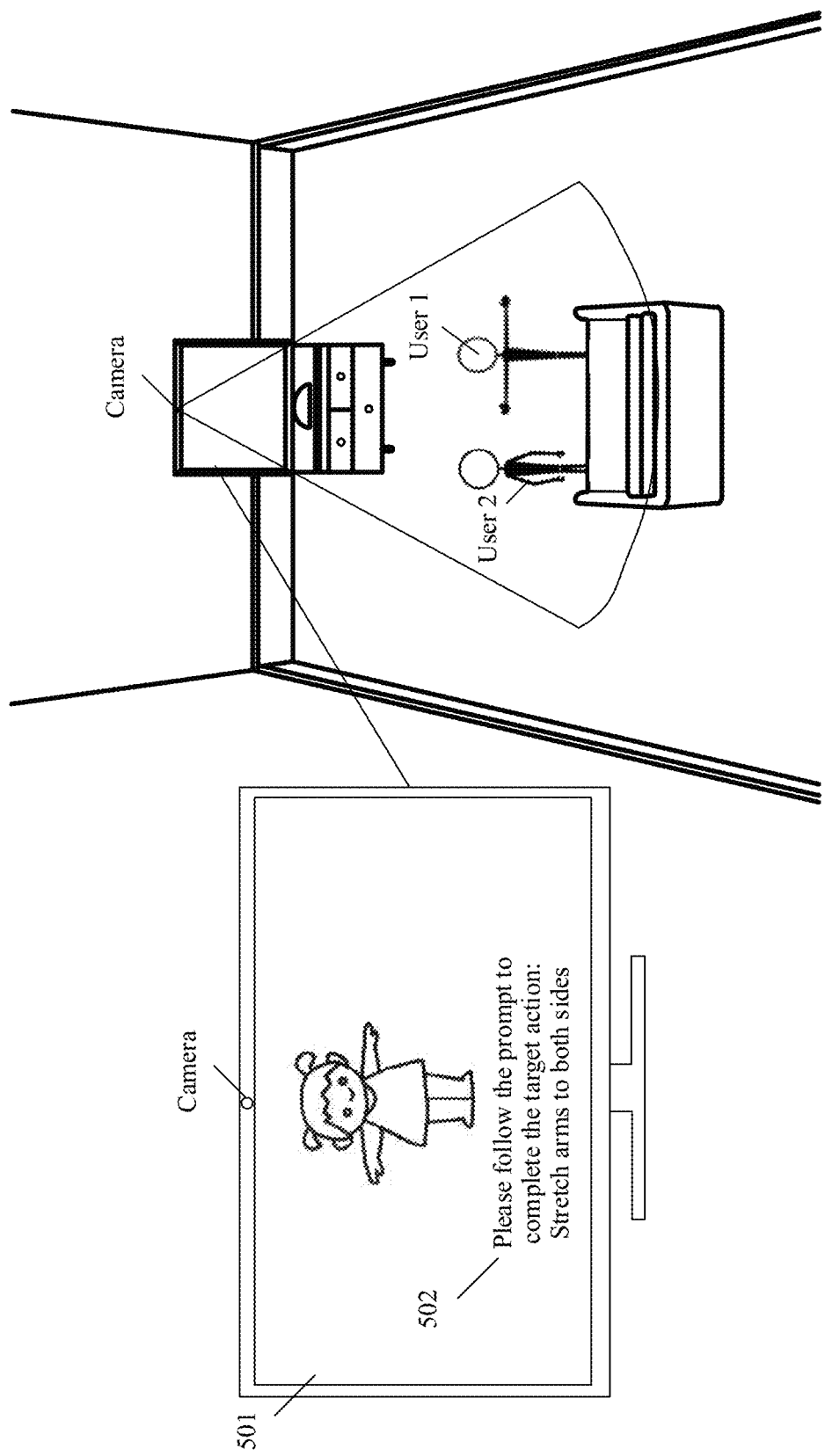
FIG. 5B is a schematic diagram of another target user recognition scenario according to an embodiment of this application.

An example in which the electronic device is a television is used with reference to the example shown in FIG. 3A and FIG. 3B. An example in which the electronic device is a television is used with reference to the example shown in FIG. 3A and FIG. 3B. After the user performs an operation on the entry 303 of the course card 1 on the interface 302 of the "AI Fitness" application by using the remote control, as shown in FIG. 5B, the television may display an interface 501. The interface 501 includes prompt information 502, and the prompt information 502 is used to prompt a user to complete a target action: stretching arms to both sides. In addition, the television may collect human poses of all users in the frame (a fan-shaped range in FIG. 5B) through the camera. As shown in FIG. 5B, the fan-shaped range includes a user 1 and a user 2. The user 1 is a user preparing to exercise. The user 1 completes the action of stretching arms to both sides according to the prompt, but the user 2 does not perform the action. After the human poses of all the users, that is, the user 1 and the user 2, in the frame are collected, the television may recognize whether the human poses of the user 1 and the user 2 match the target action. The television may match that the human pose of the user 1 matches the target action. In this case, it is determined that the user 1 is the target user.

In addition, in this embodiment, after the electronic device determines the target user, a fitness step may start. In the fitness step, the target user may complete fitness actions according to course guidance displayed on a display of the electronic device. In this Manner 2, in a fitness process of the target user, if another user wants to try fitness training or wants to complete relay training, the user may complete the foregoing target action, so as to trigger the electronic device to switch the target user. In this way, it may be relatively convenient to switch the target user, and an original target user does not need to avoid. In addition, in the fitness process of the target user, if the target user temporarily leaves the FOV of the camera, so that the electronic device switches to track a non-target user, when the user returns to the FOV of the camera, the user may also complete the foregoing target action to enable the electronic device to re-determine the user as the target user, and the other user does not need to avoid.

Manner 3: The electronic device determines the target user by using a wearable device worn by the user with reference to the recognized human pose of the user.

The wearable device may be a device such as a watch, a band, a sports headset, or a running pod. The user may pair the wearable device worn by the user with the electronic device and establish a wireless connection. In addition, in an exercise process of the user, the wearable device worn by the user may transmit motion data (for example, an angular velocity or acceleration) of the user to the electronic device.

As the example in Manner 1, the electronic device may determine the target user after receiving an operation performed by the user on the entry 303 of the course card 1 on the interface 302 of the "AI Fitness" application. In Manner 3, S201, that is, a process in which the electronic device determines the target user, may include: The electronic device opens the camera of the electronic device to play or display prompt information to prompt the users to complete a target action, for example, an iconic action such as bending arms, akimbo, swinging arms, nodding, or kicking leg. A user who needs fitness guidance completes the target action according to the prompt, but a user who does not need fitness guidance does not complete the target action according to the prompt. The electronic device collects human poses of all the users in the frame through the camera. The electronic device determines that a user whose human pose matches the target action in all the users in the frame is the target user. In addition, the electronic device may further determine motion data of the target user based on the collected human pose of the target user. The electronic device compares the determined motion data of the target user with the motion data received from the wearable device, and may determine that a wearable device whose motion data matches the determined motion data of the target user is a wearable device of the target user.

Manner 4: The electronic device may determine the target user based on a location of the user in a specific area such as the frame.

As the example in Manner 1, the electronic device may determine the target user after receiving an operation performed by the user on the entry 303 of the course card 1 on the interface 302 of the "AI Fitness" application. In Manner 4, S201, that is, a process in which the electronic device determines the target user, may be: The electronic device may determine, based on the location of the user in the specific area (such as the frame), that the user in the specific area such as a center of the frame or an identification area is the target user.

It should be noted that, in the foregoing example, after the user selects a corresponding fitness course, the electronic device is triggered to perform an operation of determining the target user. Alternatively, the electronic device may perform the operation of determining the target user at another time. For example, the electronic device may determine the target user when receiving that the user opens the "AI Fitness" application. In this embodiment of this application, a time when the electronic device performs the operation of determining the target user is not specifically limited, and the operation of determining the target user only needs to be performed before the user starts to enter the fitness step.

S202: The electronic device tracks the target user, and collects a human body image of the target user in a tracking process.

S203: The electronic device performs fitness guidance based on the human body image collected in S202.

After the electronic device determines the target user, the fitness step may start. In the fitness step, the target user may complete fitness actions according to the course guidance displayed on the display of the electronic device. In addition, in a process in which the user performs the fitness action, the electronic device may track the target user in real time through the camera, and collect the human body image of the target user, so as to recognize the fitness action of the target user based on the collected human body image. The electronic device evaluates the completion quality of the fitness action of the target user based on the recognized fitness action and a corresponding key indicator, and provides intelligent fitness guidance such as counting the actions, pointing out a wrong action, and giving guidance for improvement.

In this embodiment, the electronic device may track the target user in the following manner.

Manner A: The electronic device may track the target user by using the wearable device worn by the target user.

In some embodiments, the wearable device worn by the target user may be paired with the electronic device and establish a wireless connection. If the electronic device determines the target user in Manner 3 in S201, the wearable device of the target user is determined in S201. If the electronic device determines the target user in Manner 1, Manner 2, or Manner 4 in S201, in this embodiment, after the electronic device performs S201, that is, determines the target user, the electronic device may determine the wearable device of the target user. In some embodiments, the electronic device may determine that a wearable device associated with the electronic device is the wearable device of the target user. That the wearable device is associated with the electronic device may be: The wearable device and the electronic device log in to a same account. Alternatively, a login account of the wearable device is a contact of a login account of the electronic device. Alternatively, a login account of the wearable device is the same as a login account of a fitness application such as the "AI Fitness" application of the electronic device. The foregoing account may be an account provided by a cloud service provider for a user, for example, a Xiaomi ID, a Huawei ID, or an Apple ID, or may be an account used to log in to an application, for example, a WeChat account or a Google mailbox account. In some other embodiments, the electronic device may prompt the target user to perform a specific operation such as tapping a screen or pressing a button on the wearable device of the target user. The electronic device may determine a wearable device that receives the corresponding operation as the wearable device of the target user.

In a process in which the target user completes the fitness actions according to the course guidance, the wearable device of the target user may collect the motion data of the user, and transmit the motion data to the electronic device. The motion data may include an angular velocity, acceleration, and the like. In addition, in a process in which the target user completes the fitness actions according to the course guidance, the electronic device may track the target user by using a target tracking algorithm through the camera. If an interfering user (for example, a user that appears in the frame and affects the electronic device to collect fitness data of the target user may be referred to as an interfering user) appears in a process of tracking the target user, for example, a body of a user overlaps with a body of the target user, in other words, the electronic device detects that an interfering user exists in the frame, the electronic device may collect human poses of all users in the frame through the camera. The electronic device determines motion data of each user based on the collected human poses of all the users in the frame. Then, the determined motion data is compared with the motion data received from the wearable device, a user whose motion data matches the motion data from the wearable device in the frame is locked as the target user, and continues to track the user by using the target tracking algorithm.

For example, the electronic device is a television. The user 1 is the target user, the target 2 is the interfering user, and a wireless connection is established between a watch of the user 1 and the television. In a process in which the user 1 completes the fitness actions according to the course guidance, the watch of the user 1 collects acceleration of the user 1 and transmits the acceleration to the television. In addition, in the process in which the user 1 completes the fitness actions according to the course guidance, the television may track the user 1 by using the target tracking algorithm through the camera. In a process of tracking the user 1, a body of the user 2 overlaps with a body of the user 1, for example, the user 2 sits on a sofa beside the user 1, and the user 1 overlaps with the body of the user 2 when completing the fitness actions. In this case, the television may collect human poses of all users such as the user 1 and the user 2 in the frame through the camera. The television may determine acceleration of the user 1 and acceleration of the user 2 based on the collected human poses of the user 1 and the user 2. Then, the television may match the determined acceleration to the acceleration from the watch. If it is matched that the acceleration of the user 1 is the same as the acceleration from the watch, the television may lock the user 1 as the target user, and continue to track the user 1 by using the target tracking algorithm.

Manner B: The electronic device may recognize motion modes of all users in the frame, to track the target user.

For a provided fitness course, a motion mode of a coach in the fitness course is usually known, a motion mode of the interfering user is often different from the motion mode of the coach in the fitness course, and a motion mode of the target user is the same as the motion mode of the coach in the fitness course. Therefore, the target user can be tracked by recognizing the motion modes of all the users in the frame.

As an example, the motion mode of the coach in the fitness course may include one or more of the following modes: cross-legged jump, left-right leg jump, hand-assisted squat, side-point punch, lateral knee lift, alternate lunge squat, lunge over-head high-five jump, semi-squat jump, standing with backward leg extension, squat lateral knee lift. The motion mode of the interfering user may include one or more of the following modes: a static mode (for example, a family member sits on the sidelines and watches the target user exercising, and a body envelope box of the family member is relatively static), and a quasi-linear motion mode (for example, a family member passes through the FOV of the camera, which is similar to a straight line motion).

In a process in which the target user completes the fitness actions according to the course guidance, the electronic device may track the target user by using the target tracking algorithm through the camera. If an interfering user appears in a process of tracking the target user, for example, a body of a user overlaps with a body of the target user, in other words, the electronic device detects that an interfering user exists in the frame, the electronic device may collect human poses of all users in the frame through the camera. The electronic device determines a motion mode of each user based on the collected human poses of all the users in the frame.

In some embodiments, the electronic device may compare the determined motion mode with the motion mode of the coach in the fitness course, lock a user whose motion mode matches the motion mode of the coach in the fitness course in the frame as the target user, and continue to track the user by using the target tracking algorithm. In some other embodiments, the electronic device may first determine the interfering user in the frame and filter out the interfering user. For example, the electronic device may filter, based on the motion modes of all the users in the frame, a user whose motion mode is an interfering motion mode such as the static mode or the quasi-linear motion mode in the frame, that is, filter out the interfering user. Then, the electronic device matches the motion mode of the user in the frame after the interference user is filtered out with the motion mode of the coach in the fitness course, locks a user whose motion mode is matched as the target user, and continues to track the user by using the target tracking algorithm. A quantity of the locked target users may be one, or may be two or more. That is, the electronic device may lock all users whose motion modes match the motion mode of the coach in the fitness course in the frame as the target users and track the target users.

For example, the electronic device is a television. The user 1 is the target user, and the target 2 is the interfering user. In the process in which the user 1 completes the fitness actions according to the course guidance, the television may track the user 1 by using the target tracking algorithm through the camera. The user 2 passes by the front of the user 1 when the user 1 completes the fitness actions, that is, in a process of tracking the user 1, the body of the user 2 overlaps with the body of the user 1. In this case, the television may collect human poses of all users such as the user 1 and the user 2 in the frame through the camera, and may determine, based on the collected human poses of the user 1 and the user 2, that the motion mode of the user 1 is side-point punch, and the motion mode of the user 2 is the quasi-linear motion mode. The television may determine that the user 2 is the interfering user and filter out the user 2. The television may further determine that the motion mode of the user 1 matches the motion mode (for example, side-point punch) of the coach in the fitness course. In this case, the television may lock the user 1 as the target user, and continue to track the user 1 by using the target tracking algorithm.

Manner C: The electronic device may track the target user in combination with a feature (for example, a face, or a face and another feature such as hairstyle or clothing) of the target user.

For example, the feature of the user is the face. If the target user is determined in Manner 1 in S201, the electronic device may track the target user based on the stored face image of the target user. If the target user is determined in Manner 2 or Manner 3 in S201, after determining the target user, the electronic device may collect and store the face image of the target user, so as to track the target user based on the face image of the target user in S203.

For example, the feature of the user is the face and another feature. If the target user is determined in Manner 1 in S201, after determining the target user, the electronic device may obtain and store the other feature such as the hairstyle or clothing of the target user, so as to track the target user. If the target user is determined in Manner 2 or Manner 3 in S201, after determining the target user, the electronic device may collect and store the face image and the other feature such as the hairstyle or clothing of the target user, so as to track the target user.

In a process in which the target user completes the fitness actions according to the course guidance, the electronic device may track the target user by using the target tracking algorithm through the camera. If an interfering user appears in a process of tracking the target user, for example, a body of a user overlaps with a body of the target user, in other words, the electronic device detects that an interfering user exists in the frame, the electronic device may collect features (for example, faces or human body images) of all users in the frame through the camera. The electronic device locks, based on the collected features of all the users in the frame, a user whose feature matches the stored feature as the target user, and continues to track the user by using the target tracking algorithm.

For example, the electronic device is a television. The user 1 is the target user, the target 2 is the interfering user, and the television stores a face image of the user 1. In the process in which the user 1 completes the fitness actions according to the course guidance, the television may track the user 1 by using the target tracking algorithm through the camera. When the user 2 passes by the front of the user 1 when the user 1 completes the fitness actions, the television may collect face images of all users such as the user 1 and the user 2 in the frame through the camera. Based on the collected face images of the user 1 and the user 2, the television may lock the user 1 as the target user, and continue to track the user 1 by using the target tracking algorithm.

In addition, in this embodiment, if the electronic device detects that the interfering user continuously interferes with data collection of the target user, the electronic device may play or display prompt information to prompt the other person to avoid the area. In this way, the interfering user appearing in the frame for a long time can be avoided.

According to the technical solution in this embodiment, the electronic device may complete processes such as target user determining and target user tracking in a fitness process by using a method such as recognizing a user feature, or recognizing a user with reference to data collected by a wearable device worn by the user, so as to ensure accuracy of locking the target user, and improve user experience when an electronic device is used to perform intelligent fitness. In addition, in a fitness process of the user, if the interfering user passes by the front of the target user, or another interfering person overlaps with the target user, motion mode matching may be used to ensure accuracy of tracking the target user, avoiding a case of incorrectly transferring of the target user, and improve user experience and completability of a fitness action.

According to some other embodiments of this application, an electronic device is further provided, and is configured to perform the method in the foregoing embodiments, to implement functions of the electronic device in the foregoing embodiments. The electronic device may include a display, one or more processors, a memory, and a camera. The foregoing components may be connected through one or more communications buses. The memory stores one or more pieces of computer program code, the one or more pieces of computer program code include computer instructions, and the one or more processors are configured to execute the computer instructions, and may be configured to implement behavioral functions of the electronic device in the foregoing embodiments. The display may be configured to display content according to indications of the one or more processors, for example, display a fitness course.

According to some other embodiments of this application, a computer-readable storage medium is further provided. The computer-readable storage medium may include computer software instructions. When the computer software instructions are run on an electronic device, the electronic device is enabled to perform the steps performed by the electronic device in the foregoing embodiments.

According to some other embodiments of this application, a computer program product is further provided. When the computer program product runs on a computer, the computer is enabled to perform the steps performed by the electronic device in the foregoing embodiments.

According to some other embodiments of this application, an apparatus is further provided. The apparatus has a function of implementing behavior of the electronic device in the foregoing embodiments. The function may be implemented by hardware, or may be implemented by hardware executing corresponding software. The hardware or the software includes one or more modules corresponding to the function, for example, a determining unit or module, a collection unit or module, or a tracking unit or module.

According to some other embodiments of this application, a chip system is further provided. The chip system may be applied to an electronic device. The electronic device includes a display and a camera. The chip system includes an interface circuit and a processor. The interface circuit and the processor are interconnected through a line. The interface circuit is configured to receive a signal from a memory of the electronic device, and send the signal to the processor. The signal includes computer instructions stored in the memory. When the processor executes the computer instructions, the chip system performs the steps performed by the electronic device in the foregoing embodiments.

The electronic device, the computer-readable storage medium, the computer program product, the apparatus, and the chip system provided in the embodiments of this application may perform actions of the electronic device in the foregoing embodiments. Implementation principles and technical effects thereof are similar, and details are not described herein again.

The foregoing descriptions about implementations allow a person skilled in the art to clearly understand that, for the purpose of convenient and brief description, division of the foregoing function modules is taken as an example for illustration. In actual application, the foregoing functions may be allocated to different function modules for implementation based on a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A target user locking method, wherein the method is applied to an electronic device comprising a camera, and the method comprises:
   determining, by the electronic device, a target user, and tracking the target user through the camera by removing, by the electronic device based on the motion mode of each user in the frame, the interfering user whose motion mode is an interfering motion mode from the frame, wherein the interfering motion mode comprises at least one of a static mode and a quasi-linear motion mode;
   collecting, by the electronic device, while tracking the target user, user image data collected through the camera;
   when determining, based on the collected user image data, that an interfering user exists in a frame, collecting, by the electronic device, human poses of all users in the frame through the camera, wherein the frame comprises at least some of a field of view (FOV) of the camera;
   determining, by the electronic device, a motion mode of each user in the frame based on the human poses of all of the users in the frame; and
   determining, by the electronic device based on the motion mode of each user in the frame, where there is more than one user in the frame, that a user whose motion mode matches a known motion mode is the target user, and continuing to track the target user through the camera.

2. The method according to claim 1, wherein determining that the interfering user exists in the frame is based on the collected user image data.

3. The method according to claim 1, wherein determining the target user comprises:
   collecting, by the electronic device, the user image data through the camera; and
   determining that a plurality of users exist in the frame, and prompting, by the electronic device, the users in the frame to complete a target action, collecting human poses of the users in the frame through the camera, and determining that a user of the users in the frame whose human pose matches the target action in the frame is the target user.

4. The method according to claim 1, wherein determining the target user comprises:
   collecting, by the electronic device, the user image data through the camera; and
   determining that a plurality of users exist in the frame, collecting, by the electronic device through the camera, face images of the users in the frame, and determining that a user of the users in the frame whose face image matches a stored face image is the target user.

5. The method according to claim 4, wherein the method further comprises:
   collecting, by the electronic device, the face image of the target user, and storing the face image of the target user in association with an account; and
   determining that the user whose face image matches the stored face image in the frame is the target user comprises:
   determining, by the electronic device, that the user whose face image matches the face image stored in association with the account in the frame is the target user.

6. The method according to claim 1, wherein the known motion mode-comprises one or more of the following modes: cross-legged jump, left-right leg jump, hand-assisted squat, side-point punch, lateral knee lift, alternate lunge squat, lunge over-head high-five jump, semi-squat jump, standing with backward leg extension, squat lateral knee lift.

* * * * *

UNITED STATES PATENT AND TRADEMARK OFFICE
CERTIFICATE OF CORRECTION

PATENT NO. : 12,201,893 B2
APPLICATION NO. : 17/636725
DATED : January 21, 2025
INVENTOR(S) : Lei Huang et al.

It is certified that error appears in the above-identified patent and that said Letters Patent is hereby corrected as shown below:

In the Claims

In Column 26, Claim 6, Line 53, delete "mode-comprises" and insert -- mode comprises --, therefor.

Signed and Sealed this
Fifteenth Day of April, 2025

Coke Morgan Stewart
*Acting Director of the United States Patent and Trademark Office*